(12) United States Patent
Hu et al.

(10) Patent No.: US 12,384,721 B1
(45) Date of Patent: Aug. 12, 2025

(54) EFFICIENT SOUND-ABSORBING LIGHTWEIGHT AGGREGATE CELLULAR CONCRETE, METHOD FOR PREPARING THE SAME, AND APPLICATION THEREOF

(71) Applicant: SHANDONG UNIVERSITY, Jinan (CN)

(72) Inventors: Zhijuan Hu, Jinan (CN); Shizhao Yang, Jinan (CN); Wenlong Wang, Jinan (CN); Xujiang Wang, Jinan (CN); Jingwei Li, Jinan (CN); Xiangkun Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/095,142

(22) Filed: Mar. 31, 2025

(30) Foreign Application Priority Data

Dec. 30, 2024 (CN) .......................... 202411962383.0

(51) Int. Cl.
| | | |
|---|---|---|
| *C04B 18/02* | (2006.01) | |
| *C04B 7/14* | (2006.01) | |
| *C04B 7/26* | (2006.01) | |
| *C04B 12/00* | (2006.01) | |
| *C04B 14/18* | (2006.01) | |
| *C04B 14/42* | (2006.01) | |
| *C04B 16/06* | (2006.01) | |
| *C04B 18/04* | (2006.01) | |
| *C04B 22/06* | (2006.01) | |
| *C04B 24/16* | (2006.01) | |
| *C04B 24/26* | (2006.01) | |
| *C04B 24/38* | (2006.01) | |
| *C04B 28/36* | (2006.01) | |
| *C04B 40/00* | (2006.01) | |
| *C04B 103/32* | (2006.01) | |
| *C04B 103/44* | (2006.01) | |
| *C04B 103/48* | (2006.01) | |
| *C04B 111/00* | (2006.01) | |
| *C04B 111/40* | (2006.01) | |
| *C04B 111/52* | (2006.01) | |

(52) U.S. Cl.
CPC .............. *C04B 18/027* (2013.01); *C04B 7/14* (2013.01); *C04B 7/26* (2013.01); *C04B 12/00* (2013.01); *C04B 14/185* (2013.01); *C04B 14/42* (2013.01); *C04B 16/0633* (2013.01); *C04B 16/0641* (2013.01); *C04B 18/0445* (2013.01); *C04B 22/068* (2013.01); *C04B 24/168* (2013.01); *C04B 24/2641* (2013.01); *C04B 24/2652* (2013.01); *C04B 24/383* (2013.01); *C04B 28/36* (2013.01); *C04B 40/0042* (2013.01); *C04B 40/0046* (2013.01); *C04B 2103/32* (2013.01); *C04B 2103/44* (2013.01); *C04B 2103/48* (2013.01); *C04B 2111/00215* (2013.01); *C04B 2111/40* (2013.01); *C04B 2111/52* (2013.01); *C04B 2201/20* (2013.01)

(58) Field of Classification Search
CPC ............ C04B 24/2641; C04B 24/2652; C04B 24/383; C04B 28/36; C04B 40/0042; C04B 40/0046; C04B 2103/32; C04B 2103/44; C04B 2103/48; C04B 2111/00215; C04B 2111/40; C04B 2111/52; C04B 2201/20
See application file for complete search history.

(56) References Cited

FOREIGN PATENT DOCUMENTS

| CN | 103304200 A | 9/2013 |
|---|---|---|
| CN | 104108949 A | 10/2014 |
| CN | 112174692 A | 1/2021 |
| CN | 116003092 A | 4/2023 |
| JP | H09301784 A | 11/1997 |
| KR | 20040080665 A | 9/2004 |
| KR | 101985722 B1 | 6/2019 |

*Primary Examiner* — Anthony J Green
(74) *Attorney, Agent, or Firm* — IPRO, PLLC

(57) ABSTRACT

An efficient sound-absorbing lightweight aggregate cellular concrete, a method for preparing the same, and an application thereof. The concrete comprises: 85-95 parts by weight of low-carbon sulfur-aluminum-ferric cementitious materials, 5-15 parts by weight of supplementary cementitious material, 0.6-1.5 parts by weight of functional admixture, 20-60 parts by weight of non-sintered lightweight aggregate, 0.35-0.45 parts by weight of water, and 0.5-1.5 L of pre-formed foam. The non-sintered lightweight aggregate includes cementitious materials, byproduct gypsum, hydrogen peroxide, water, and expanded perlite. A multi-level pore structure is constructed from expanded perlite pores, hydrogen peroxide foaming pores, and physical foaming pores. The material exhibits a noise reduction coefficient $\geq 0.80$, a bulk density $\leq 500$ kg/m$^3$, and a flexural strength $\geq 1.5$ MPa.

7 Claims, 2 Drawing Sheets

EFFICIENT SOUND-ABSORBING LIGHTWEIGHT AGGREGATE CELLULAR CONCRETE, METHOD FOR PREPARING THE SAME, AND APPLICATION THEREOF

CROSS-REFERENCE TO RELATED APPLICATION

The present invention claims priority to Chinese Patent Application No. 202411962383.0, filed with the China National Intellectual Property Administration on Dec. 30, 2024 and entitled "EFFICIENT SOUND-ABSORBING LIGHTWEIGHT AGGREGATE CELLULAR CONCRETE, METHOD FOR PREPARING THE SAME, AND APPLICATION THEREOF", which is incorporated herein by reference in its entirety and constitutes a part of the present invention for all purposes.

TECHNICAL FIELD

The present invention relates to the field of inorganic nonmetallic materials, and more particularly to an efficient sound-absorbing lightweight aggregate cellular concrete, a method for preparing the same, and an application thereof.

BACKGROUND

The information disclosed in this background section is provided solely to enhance the understanding of the general background of the invention and should not necessarily be considered to be prior art known to those skilled in the art.

With modern urbanization and dense transportation networks, noise pollution along highways, railways, and subway lines has become increasingly prominent. Traffic noise in these areas is often persistent and affects a wide range, not only impacting the daily lives of residents along these routes but also posing potential threats to human health. More seriously, continuous traffic noise can increase the risk of chronic diseases. Therefore, controlling noise pollution in these environments is critical for the health and quality of life of urban residents.

Existing technical solutions mainly include mineral wool, glass fiber wool, polyurethane foam, and cellular concrete sound-absorbing board. Cellular concrete sound-absorbing panels are particularly suitable for complex outdoor environments due to their strong weather resistance, good fire resistance and durability, and case of construction and maintenance. However, the sound absorption coefficient of cellular concrete is relatively limited, especially its low-frequency absorption performance.

Additionally, the raw materials for cellular concrete typically require cement and natural sand and grave, etc. The cement industry accounts for about 8% of global anthropogenic $CO_2$ emissions. Excessive extraction of sand and gravel seriously threatens the stability of river channels and river ecosystems. Furthermore, traditional cement-based materials solidify relatively slowly, which causes instability in the pore structure of cellular concrete and long production cycles. These issues are not conducive to low-carbon sustainable development. Therefore, it is necessary to develop solid waste-based lightweight aggregate cellular concrete with good sound absorption performance and adjustable sound absorption frequency range. When used on walls of highways, railways, and subways, this material will effectively reduce noise propagation and diffusion, lower the negative impact of noise sources on people, and ultimately improve the overall quality of the urban living environment from the source.

SUMMARY

To address the deficiencies of the prior art, the present invention provides an efficient sound-absorbing lightweight aggregate cellular concrete, a method for preparing the same, and an application thereof. By constructing a multi-level and multi-scale pore structure system comprising expanded perlite pores, hydrogen peroxide foaming pores, and physical foaming pores, the invention achieves balanced broadband sound absorption performance with adjustable sound absorption frequency range. The efficient sound-absorbing lightweight aggregate cellular concrete has a noise reduction coefficient (NRC)≥0.80, a bulk density≤500 kg/m³, and a flexural strength ≥1.5 MPa.

To achieve the above objectives, the technical solution of the present invention is as follows:

In a first aspect, the present invention provides an efficient sound-absorbing lightweight aggregate cellular concrete, comprising: 85-95 parts by weight of low-carbon sulfur-aluminum-ferric cementitious material, 5-15 parts by weight of supplementary cementitious material, 0.6-1.5 parts by weight of functional admixture, 20-60 parts by weight of non-sintered lightweight aggregate (non-sintered lightweight aggregate in the present invention is prepared at ambient temperature without any thermal treatment or autoclaving processes), 0.35-0.45 parts by weight of water, and 0.5-1.5 L of preformed foam;

wherein the non-sintered lightweight aggregate comprises, based on parts by weight: 40-50 parts of low-carbon sulfur-aluminum-ferric cementitious material, 50-60 parts of byproduct gypsum, 0.7-1.5 parts of chemical foaming agent, 15-22 parts of water, and 5-8 parts of expanded perlite;

the efficient sound-absorbing lightweight aggregate cellular concrete has a noise reduction coefficient (NRC) ≥0.80, a bulk density≤500 kg/m³, and a flexural strength of 1.5 MPa.

Preferably, 0.80≤ the noise reduction coefficient≤0.90, and 200 kg/m³≤ the bulk density≤500 kg/m³.

The efficient sound-absorbing lightweight aggregate cellular concrete constructs a multi-level and multi-scale pore structure system comprising expanded perlite pores, hydrogen peroxide foaming pores, and physical foaming pores, wherein the expanded perlite forms primary pores with sizes of 20-200 μm, the hydrogen peroxide foaming forms secondary pores with sizes of ≤20 μm, and the physical foaming forms multi-level pores with sizes of 200-1500 μm.

In one or more embodiments, the low-carbon sulfur-aluminum-ferric cementitious materials contains CaO≥37%, $Al_2O_3$≥20%, $Fe_2O_3$≥6%, and $SO_3$≥8%. The supplementary cementitious material includes slag, fly ash, or silica fume, with a fineness specific surface area not less than 350 m²/kg.

In one or more embodiments, the functional admixture comprises, based on parts by weight: 0.2-0.6 parts of water reducer, 0.1-0.3 parts of thickener, and 0.3-0.6 parts of chopped fiber.

Further, the water reducer is a polycarboxylate superplasticizer; the thickener is selected from one or more of hydroxypropyl methyl cellulose ether, starch, and polyacrylamide; and the chopped fiber is selected from one or more of polypropylene fiber, polyvinyl alcohol fiber, and glass fiber, with a length of 3 mm-12 mm.

In one or more embodiments, the byproduct gypsum is flue gas desulfurization gypsum, phosphogypsum, or fluorgypsum, with a dihydrate gypsum content greater than 90% and an average particle size of ≤50 μm.

In one or more embodiments, the chemical foaming agent is hydrogen peroxide with a mass concentration of 30-50%.

In one or more embodiments, the expanded perlite has a bulk density of 100-130 kg/m$^3$.

In one or more embodiments, the preformed foam includes a foaming agent, water, and a foam stabilizer, wherein the dilution ratio of the foaming agent to water is 1:(20-45), and the foam stabilizer accounts for 2%-5% of the mass of the foaming agent.

Further, the foaming agent is a rosin-based foaming agent, a synthetic surfactant foaming agent, a protein foaming agent, or a composite foaming agent.

Further, the foam stabilizer is selected from one or more of Xanthan gum, silica gel, and polyvinyl alcohol.

In a second aspect, the present invention provides a method for preparing the efficient sound-absorbing lightweight aggregate cellular concrete described above, comprising:

Step 1: stirring the low-carbon sulfur-aluminum-ferric cementitious materials, the supplementary cementitious material, the functional admixture, and water to form a uniformly mixed slurry;

Step 2: adding a pre-wetted non-sintered lightweight aggregate into the uniformly mixed slurry, and continuing to stir;

Step 3: adding the preformed foam, and stirring until no white foam remains, then casting in a mold for solidification, which can be demolded after 6-8 hours, thus completing the preparation of the efficient sound-absorbing lightweight aggregate cellular concrete.

In one or more embodiments, in Step 1, stirring is performed for a time of 3-5 min at a speed of 40-60 r/min.

In step 2, stirring is performed at a speed of 25-35 r/min for a time of 1-3 min.

In one or more embodiments, a method for preparing the non-sintered lightweight aggregate comprises: mixing the low-carbon sulfur-aluminum-ferric cementitious materials and the by-product gypsum in dry form uniformly to form a mixture; using the expanded perlite as a seed particle, and in a granulator, spraying the mixture while simultaneously spraying a mixture of chemical foaming agent and water, to complete the preparation of the non-sintered lightweight aggregate.

In one or more embodiments, in Step 3, a method for preparing the preformed foam comprises: taking the foaming agent and diluting the foaming agent with water in a ratio of 1:(20-45), and adding the foam stabilizer that accounts for 2%-5% of the foaming agent mass, stirring uniformly to make a foaming liquid; taking the foaming liquid and placing the foaming liquid in a foaming machine to prepare the preformed foam.

In a third aspect, the present invention provides an application of the efficient sound-absorbing lightweight aggregate cellular concrete described above in sound insulation and noise reduction in the fields of construction and transportation.

One or some of the foregoing technical solutions have the following advantages or beneficial effects.

(1) The present invention provides an efficient sound-absorbing lightweight aggregate cellular concrete, which constructs a multi-level open-pore structure comprising expanded perlite pores, hydrogen peroxide foaming pores, and physical foaming pores. This enriches the pore structure of the material, significantly improves the sound absorption performance, notably enhances low-frequency sound absorption, steadily improves high-frequency sound absorption, and achieves relatively balanced broadband sound absorption performance with adjustable sound absorption frequency range (50-6500 Hz). The material has an NRC greater than 0.80, a bulk density ≤500 kg/m$^3$, and a flexural strength ≥1.5 MPa.

(2) The present invention solves the problem of utilizing low-grade solid waste. In the preparation process of efficient sound-absorbing lightweight aggregate cellular concrete, it achieves synergistic activation and cascade utilization of solid waste, significantly increasing the comprehensive utilization rate of industrial waste while ensuring excellent mechanical properties, compatibility, and strength. Specifically, synergistic activation refers to the participation and promotion of calcium sulfate in by-product gypsum in the hydration of calcium sulphoaluminate in the low-carbon sulfur-aluminum-ferric cementitious materials, jointly forming ettringite and aluminum gel. The alkalinity of the cementitious material and the calcium sulfate in by-product gypsum work together to activate the release of active silicon and aluminum in the supplementary cementitious material, further synergistically synthesizing new ettringite and C—S—H gel, etc. Their synergistic activation jointly promotes the formation of hydration products and performance improvement. Cascade utilization refers to not only incorporating a large amount of solid waste in the preparation of low-carbon sulfur-aluminum-ferric cementitious materials but also further compounding supplementary cementitious materials, by-product gypsum, and other solid waste during the use of low-carbon sulfur-aluminum-ferric cementitious materials, achieving multi-level utilization of solid waste.

(3) The entire preparation process combines the characteristics of rapid hardening and high early strength of low-carbon sulfur-aluminum-ferric cementitious materials, which can achieve rapid setting and foam structure fixation in the early stage, improving the stability of the foam matrix. The process eliminates the need for steam curing and other processes, reducing energy consumption, significantly shortening product demolding time, and improving production efficiency.

BRIEF DESCRIPTION OF THE DRAWINGS

The accompanying drawings constituting a part of the present invention are used to provide further understanding of the present invention. The exemplary examples of the present invention and descriptions thereof are used to explain the present invention, and do not constitute improper limitation of the present invention.

DETAILED DESCRIPTION

Figure 1:
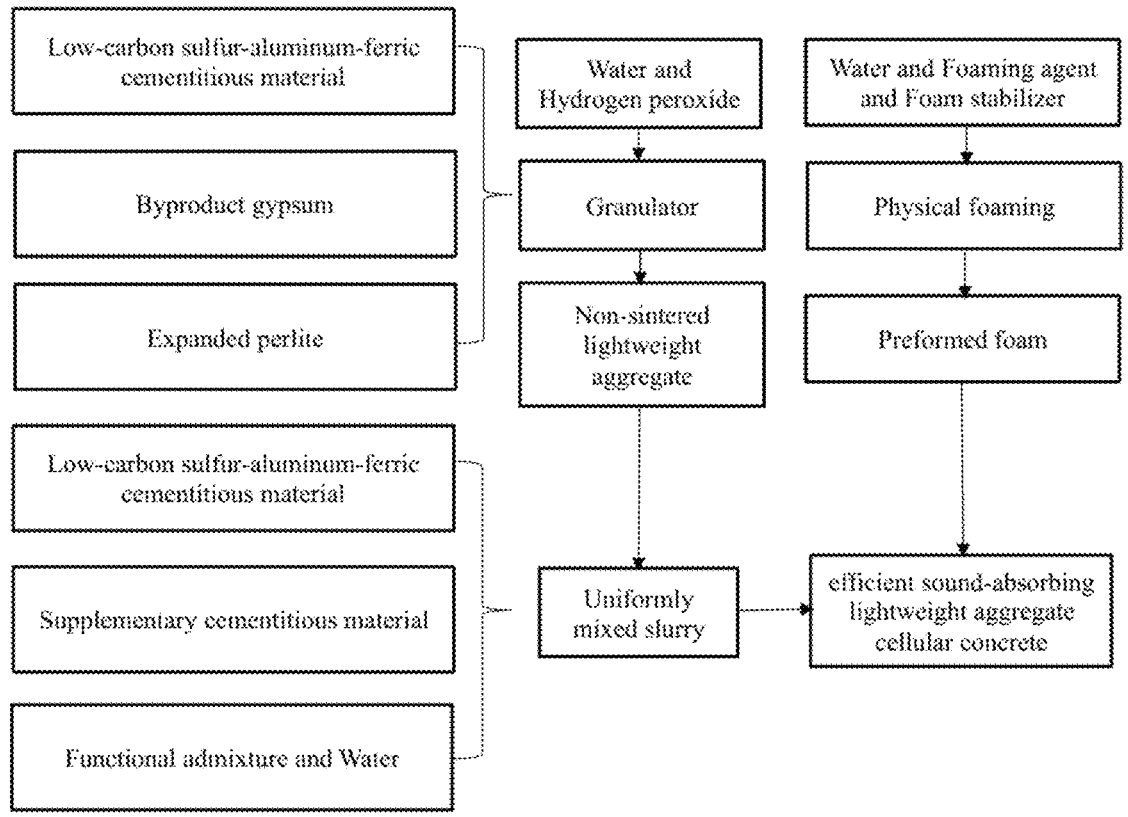
FIG. 1 is a flowchart of a process according to an example of the present invention.

To solve the following technical problems in the prior art: (1) traditional foamed concrete has poor sound absorption performance, especially low-frequency sound absorption performance; (2) it is difficult to ensure the stability of the pore structure in traditional foam concrete, and the pore structure is singular; (3) traditional foam concrete has higher carbon emissions and energy consumption, with longer production cycles, which is not conducive to sustainable development. The present invention provides an efficient sound-absorbing lightweight aggregate cellular concrete and a method for preparing the same. Using low-carbon sulfur-aluminum-ferric cementitious materials and by-product gypsum as composite cementitious materials, hydrogen peroxide as a foaming agent, and expanded perlite as a seed particle, non-sintered lightweight aggregate is synthesized in a granulator; then, using low-carbon sulfur-aluminum-ferric cementitious material and supplementary cementitious material as binders, self-made non-sintered lightweight aggregate as aggregate, water reducer, thickener, and chopped fibers as functional admixtures, and by adding water and preformed foam, a sound-absorbing lightweight aggregate cellular concrete with good sound absorption performance, adjustable sound absorption frequency range, and low-carbon sustainability is ultimately synthesized.

This lightweight aggregate cellular concrete significantly improves the sound absorption performance of the material, achieving relatively balanced broadband sound absorption performance with adjustable sound absorption frequency range; enriches the pore structure of the material while ensuring good compatibility and strength performance; solves the problem of utilizing low-grade solid waste, achieving multi-level utilization of solid waste; improves the early hardening speed of sound-absorbing materials, shortening the production cycle of the product.

Compared with existing technologies, the efficient sound-absorbing lightweight aggregate cellular concrete prepared by the present invention has excellent sound absorption performance, achieving relatively balanced broadband sound absorption performance with adjustable sound absorption frequency range. The main technical means are as follows:

(1) By introducing expanded perlite to enrich the internal open-pore structure, forming primary open pores with sizes of 20-200 μm.

(2) Performing surface modification treatment on the expanded perlite to strengthen its bonding with the cementitious system, while using hydrogen peroxide for in-situ foaming to introduce pores into its surface shell layer, constructing open secondary pores with sizes of ≤20 μm. Specifically, expanded perlite has a single open-pore structure. To further enrich its pores and enhance its bonding strength in the cementitious slurry, the expanded perlite is encapsulated and modified, that is, using low-carbon sulfur-aluminum-ferric cementitious materials and byproduct gypsum to form a core-shell structure on its surface. Of course, to ensure the porosity of the core-shell structure, chemical foaming is introduced, ultimately preparing non-sintered lightweight aggregate with a porous structure.

(3) Through physical foaming, a porous matrix is further formed. Additionally, the introduction of non-sintered lightweight aggregate increases the proportion of open pores in the matrix through disturbance during the mixing process, with pore sizes of 200-1500 μm. Eventually, a multi-level and multi-scale open-pore structure is constructed. Here, multi-level pores refer to the structural levels, including the selected expanded perlite, chemical foaming during the core-shell encapsulation process, and physical foaming pores of the cementitious slurry itself, hence the term multi-level pores. Multi-scale pores refer to the inclusion of nanopores, micropores, and millimeter pores through these methods.

It is to be noted that in the present invention, chemical foaming is mainly used to modify expanded perlite. By encapsulating and modifying the outer layer of expanded perlite and chemical foaming, lightweight aggregate is ultimately prepared, enriching its nano-open-pore structure and enhancing its strength; while physical foaming is mainly used to introduce millimeter pores into the cementitious slurry.

Throughout the preparation process, low-grade industrial waste achieves cascade utilization, significantly increasing the comprehensive utilization rate. Taking phosphogypsum as an example, it is not only one of the raw materials for sulfur-aluminum-ferric cementitious material but is also used for modifying expanded perlite and preparing cellular concrete. The sulfur-aluminum-ferric cementitious material used is a self-developed product with rapid hardening, high mechanical strength, and corrosion-resistant characteristics. Since the raw materials are almost entirely sourced from industrial solid waste, and the calcination temperature is about 300° C. lower than that of ordinary Portland cement clinker, it consumes less energy and belongs to a low-carbon cementitious system. Using it to prepare cellular concrete can greatly improve the early performance of the material, thus eliminating steam curing and other processes, reducing process energy consumption, and significantly shortening product demolding time, improving production efficiency. Therefore, the present invention uses a large amount of industrial solid waste as raw material to prepare a lightweight aggregate cellular concrete with good sound absorption performance, adjustable sound absorption frequency range, and low-carbon sustainability.

In a typical embodiment, the present invention provides an efficient sound-absorbing lightweight aggregate cellular concrete, wherein raw materials of the concrete comprise: 85-95 parts by weight of low-carbon sulfur-aluminum-ferric cementitious materials, 5-15 parts by weight of supplementary cementitious material, 0.6-1.5 parts by weight of functional admixture, 20-60 parts by weight of non-sintered lightweight aggregate, 0.35-0.45 parts by weight of water, and 0.5-1.5 L of preformed foam.

The non-sintered lightweight aggregate comprises, based on parts by weight, 40-50 parts of low-carbon sulfur-aluminum-ferric cementitious materials, 50-60 parts of byproduct gypsum, 0.7-1.5 parts of chemical foaming agent, 15-22 parts of water, and 5-8 parts of expanded perlite.

The efficient sound-absorbing lightweight aggregate cellular concrete has a noise reduction coefficient (NRC)≥0.80, a bulk density of 500 kg/m$^3$, and a flexural strength ≥1.5 MPa. Preferably, 0.80≤ the NRC≤0.90, and 200 kg/m$^3$≤ the bulk density≤500 kg/m$^3$.

The noise reduction coefficient (NRC) of the cellular concrete is the average of sound absorption coefficients measured at four frequencies: 250 Hz, 500 Hz, 1000 Hz, and 2000 Hz.

In one or more embodiments, the low-carbon sulfur-aluminum-ferric cementitious material contains CaO≥37%, $Al_2O_3 \geq 20\%$, $Fe_2O_3 \geq 6\%$, and $SO_3 \geq 8\%$, which is prepared by grinding 80% of clinker, 15% of byproduct gypsum, and 5% of limestone powder together. Its preparation method is as follows: the clinker is prepared using solid waste containing silicon, aluminum, iron compounds and calcium sulfate as the main raw materials, calcined at 1150-1250° C., to obtain a cementitious material with the main mineral components being anhydrous calcium sulphoaluminate, Fe—Al substituted calcium sulphoaluminate, dicalcium silicate, iron phase, and anhydrous calcium sulfate.

In one or more embodiments, the supplementary cementitious material comprises slag, fly ash, or silica fume, with a fineness specific surface area not less than 350 $m^2/kg$.

In one or more embodiments, the functional admixture comprises, based on parts by weight: 0.2-0.6 parts of water reducer, 0.1-0.3 parts of thickener, and 0.3-0.6 parts of chopped fiber.

Further, the water reducer is a polycarboxylate superplasticizer with a water reducing efficiency of 18-30%.

Further, the thickener is hydroxypropyl methyl cellulose ether, starch, polyacrylamide, etc.

Further, the chopped fiber is one or more of polypropylene fiber, polyvinyl alcohol fiber, and glass fiber, with a length of 3 mm-12 mm.

In one or more embodiments, the preformed foam comprises a foaming agent, water, and a foam stabilizer. The foaming agent is a rosin-based foaming agent, a synthetic surfactant foaming agent, a protein foaming agent, and a composite foaming agent, and the foam stabilizer is Xanthan gum, silica gel, polyvinyl alcohol, etc. The dilution ratio of the foaming agent to water is 1: (20-45), and the foam stabilizer accounts for 2%-5% of the mass of the foaming agent.

In one or more embodiments, the by-product gypsum is original flue gas desulfurization gypsum, phosphogypsum, or fluorgypsum, etc., mainly providing calcium sulfate needed for the system's hydration, with a dihydrate gypsum content greater than 90% and an average particle size $\leq 50$ μm.

In one or more embodiments, the chemical foaming agent is hydrogen peroxide with a mass concentration i of 30%-50%. Hydrogen peroxide is mixed with water to make a chemical foaming agent mixture, wherein 0.7-1.5 parts of chemical foaming agent and 15-22 parts of water. No foaming catalyst is needed during the chemical foaming process, which is due to the increased Fe content in the low-carbon sulfur-aluminum-ferric cementitious material mentioned above, wherein $Fe^{3+}$ can also act as a catalyst for the decomposition of hydrogen peroxide.

In one or more embodiments, the expanded perlite has a bulk density of 100-130 $kg/m^3$.

In another typical embodiment, the present invention provides a method for preparing the efficient sound-absorbing lightweight aggregate cellular concrete described above, comprising:

Step 1: stirring the low-carbon sulfur-aluminum-ferric cementitious materials, the supplementary cementitious material, the functional admixture, and water to form a uniformly mixed slurry;

Step 2: adding a pre-wetted non-sintered lightweight aggregate into the uniformly mixed slurry, and continuing to stir;

Step 3: adding the preformed foam, and stirring until no white foam remains, then casting in a mold for solidification, which can be demolded after 6-8 hours, thus completing the preparation of the efficient sound-absorbing lightweight aggregate cellular concrete.

In one or more embodiments, in Step 1, stirring is performed for a time of 3-5 min at a speed of 40-60 r/min.

In one or more embodiments, in Step 2, stirring is performed at a speed of 25-35 r/min for a time of 1-3 min.

In one or more embodiments, in Step 2, a method for preparing the non-sintered lightweight aggregate comprises: mixing the low-carbon sulfur-aluminum-ferric cementitious materials and the by-product gypsum in dry form uniformly to form a mixture; using the expanded perlite as a seed particle, and in a granulator, spraying the mixture while simultaneously spraying a mixture of chemical foaming agent and water, to complete the preparation of the non-sintered lightweight aggregate.

The mixture of chemical foaming agent and water is a mixture of hydrogen peroxide and water.

In one or more embodiments, in Step 2, the pre-wetted non-sintered lightweight aggregate refers to immersing a certain mass of dried non-sintered lightweight aggregate completely in water for 20-60 min, then placing it on a screen for 5-15 min, observing that no water drops from the non-sintered lightweight aggregate anymore. The purpose of this step is to avoid absorption of water from the mixed slurry when directly adding dried non-sintered lightweight aggregate to the mixed slurry.

In one or more embodiments, in Step 3, the preformed foam comprises a foaming agent, water, and a foam stabilizer. The foaming agent is a rosin-based foaming agent, a synthetic surfactant foaming agent, a protein foaming agent, or a composite foaming agent; and the foam stabilizer is selected from one or more of Xanthan gum, silica gel, and polyvinyl alcohol. A specific method for preparing the preformed foam comprises: taking the foaming agent and diluting the foaming agent with water in a ratio of 1:(20-45), and adding the foam stabilizer that accounts for 2%-5% of the foaming agent mass, stirring uniformly to make a foaming liquid, ready for use; placing the foaming liquid in a physical foaming machine, with a foaming pressure of 0.5 MPa and a water pump frequency of 70-90%, to prepare the preformed foam.

To enable a person skilled in the art to better understand the technical solutions of the present invention, the technical solutions of the present invention will be described in detail in conjunction with specific examples.

Example 1

An efficient sound-absorbing lightweight aggregate cellular concrete and a method for preparing the same were provided, comprising the following steps:

(1) 40 parts by weight of low-carbon sulfur-aluminum-ferric cementitious materials and 60 parts by weight of phosphogypsum were taken and uniformly dry-mixed to form a mixture for later use.

(2) 1.5 parts by weight of hydrogen peroxide were weighed and dissolved in 22 parts by weight of water to form a chemical foaming mixture for later use.

(3) 8 parts by weight of expanded perlite with a bulk density of 100 $kg/m^3$ were used as seed particles. In a granulator, the mixture from step (1) and the chemical foaming mixture from step (2) were sprayed simultaneously during granulation to prepare non-sintered lightweight aggregate.

(4) 85 parts by weight of low-carbon sulfur-aluminum-ferric cementitious materials, 15 parts by weight of slag, 0.6 parts by weight of polycarboxylate superplasticizer, 0.3 parts by weight of hydroxypropyl methyl cellulose ether, 0.6 parts by weight of chopped fibers, and 0.35 parts by weight of water were stirred at a speed of 50±5 r/min for 3 minutes to form a slurry for later use.

(5) 20 parts by weight of the non-sintered lightweight aggregate from step (3) were pre-wetted and allowed to stand, then added to the slurry from step (4), and stirred using a horizontal mixer at 30±5 r/min for 2 minutes to obtain a mixture for later use.

(6) A foaming agent and water were diluted at a ratio of 1:30, and xanthan gum accounting for 2% of the mass of the foaming agent was added and stirred uniformly to prepare a foaming liquid for later use.

(7) The foaming liquid from step (6) was placed into a cement foaming machine. With a foaming pressure of 0.5 MPa and a water pump frequency of 80%, preformed foam was prepared and reserved.

(8) 1.4 L of the preformed foam from step (7) were added to the mixture from step (5) and stirred until no white foam remained. The mixture was cast into molds for curing and demolded after 8 hours, completing the preparation of the efficient sound-absorbing lightweight aggregate cellular concrete.

The resulting product had an NRC of 0.83, a bulk density of 350 kg/m$^3$, and a flexural strength of 1.5 MPa.

Figure 2:
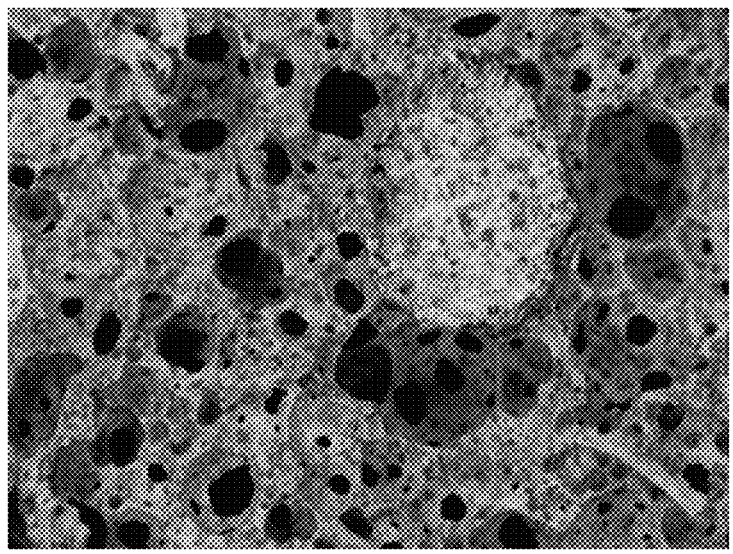
FIG. 2 is an internal pore diagram of the efficient sound-absorbing lightweight aggregate cellular concrete prepared in Example 1 of the present invention, with a magnification of 20 times.
Figure 3:
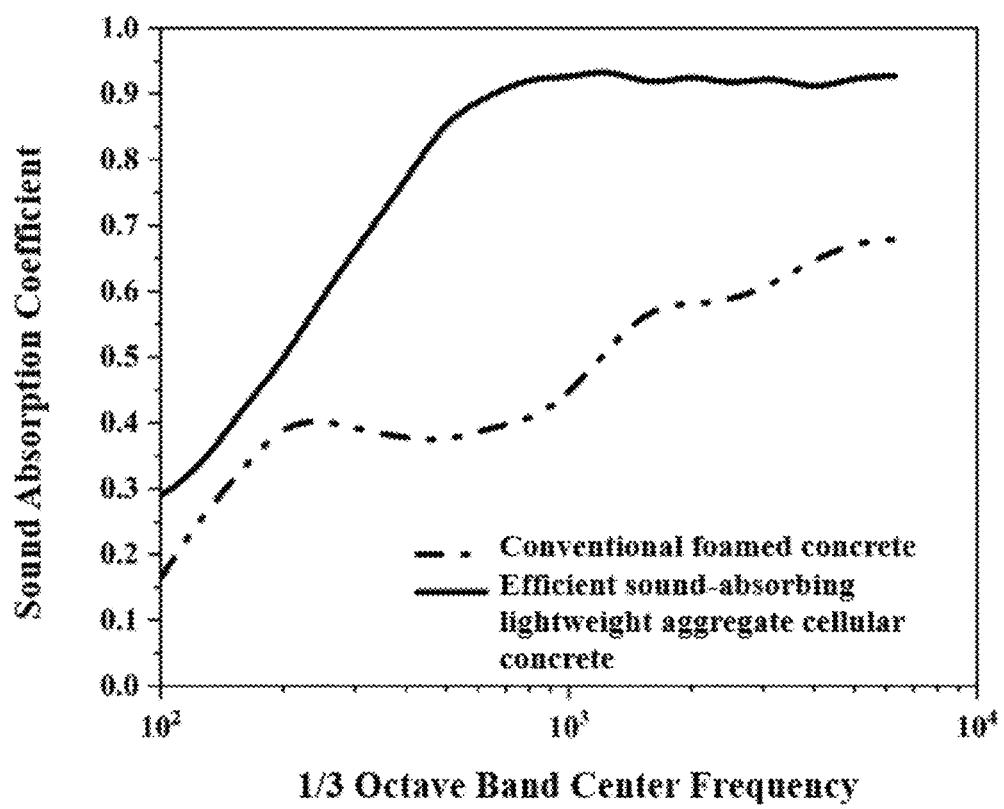
FIG. 3 shows a comparison of sound absorption performance between the efficient sound-absorbing lightweight aggregate cellular concrete prepared in Example 1 of the present invention and the conventional cellular concrete prepared in Comparative Example 1.

FIG. 2 shows an internal pore diagram of the efficient sound-absorbing lightweight aggregate cellular concrete prepared in Example 1. The magnification was 20×, and a hierarchical multi-scale open-pore structure could be clearly observed.

Example 2

An efficient sound-absorbing lightweight aggregate cellular concrete and a method for preparing the same were provided, comprising the following steps:

(1) 45 parts by weight of low-carbon sulfur-aluminum-ferric cementitious materials and 55 parts by weight of desulfurization gypsum were dry-mixed uniformly to form a mixture for later use.

(2) 1.1 parts by weight of hydrogen peroxide were weighed and dissolved in 19 parts by weight of water to form a chemical foaming mixture for later use.

(3) 6.5 parts by weight of expanded perlite with a bulk density of 110 kg/m$^3$ were used as seed particles. In a granulator, the mixture from step (1) and the chemical foaming mixture from step (2) were sprayed simultaneously to prepare non-sintered lightweight aggregate.

(4) 90 parts by weight of low-carbon sulfur-aluminum-ferric cementitious materials, 10 parts by weight of fly ash, 0.4 parts by weight of polycarboxylate superplasticizer, 0.2 parts by weight of hydroxypropyl methyl cellulose ether, 0.45 parts by weight of chopped fibers, and 0.40 parts by weight of water were stirred at 50±5 r/min for 3 minutes to form a slurry for later use.

(5) 40 parts by weight of the non-sintered lightweight aggregate from step (3) were pre-wetted and allowed to stand, then added to the slurry from step (4) and stirred at 30±5 r/min for 1 minute for later use.

(6) A foaming agent and water were diluted at a ratio of 1:30. Xanthan gum, accounting for 3% of the mass of the foaming agent, was added and stirred uniformly to prepare a foaming liquid for later use.

(7) The foaming liquid from step (6) was placed in a cement foaming machine. With a foaming pressure of 0.5 MPa and a water pump frequency of 85%, preformed foam was prepared and reserved.

(8) 1.1 L of the preformed foam from step (7) were added to the mixture from step (5) and stirred until no white foam remained. The mixture was cast into molds for curing and demolded after 7 hours, completing the preparation of the efficient sound-absorbing lightweight aggregate cellular concrete.

The resulting product had an NRC of 0.81, a bulk density of 420 kg/m$^3$, and a flexural strength of 1.7 MPa.

Example 3

An efficient sound-absorbing lightweight aggregate cellular concrete and a method for preparing the same were provided, comprising the following steps:

(1) 50 parts by weight of low-carbon sulfur-aluminum-ferric cementitious materials and 50 parts by weight of fluorgypsum were dry-mixed uniformly to form a mixture for later use.

(2) 0.8 parts by weight of hydrogen peroxide were weighed and dissolved in 16 parts by weight of water to form a chemical foaming mixture for later use.

(3) 5 parts by weight of expanded perlite with a bulk density of 130 kg/m$^3$ were used as seed particles. In a granulator, the mixture from step (1) and the chemical foaming mixture from step (2) were sprayed simultaneously to prepare non-sintered lightweight aggregate.

(4) 95 parts by weight of low-carbon sulfur-aluminum-ferric cementitious materials, 5 parts by weight of silica fume, 0.2 parts by weight of polycarboxylate superplasticizer, 0.1 parts by weight of hydroxypropyl methyl cellulose ether, 0.3 parts by weight of chopped fibers, and 0.45 parts by weight of water were stirred at 50±5 r/min for 3 minutes to form a slurry for later use.

(5) 60 parts by weight of the non-sintered lightweight aggregate from step (3) were pre-wetted and allowed to stand, then added to the slurry from step (4), and stirred at 30±5 r/min for 1 minute for later use.

(6) A foaming agent and water were diluted at a ratio of 1:30. Xanthan gum, accounting for 5% of the mass of the foaming agent, was added and stirred uniformly to prepare a foaming liquid for later use.

(7) The foaming liquid from step (6) was placed in a cement foaming machine. With a foaming pressure of 0.5 MPa and a water pump frequency of 90%, preformed foam was prepared and reserved.

(8) 0.8 L of the preformed foam from step (7) were added to the mixture from step (5) and stirred until no white foam remained. The mixture was cast into molds for curing and demolded after 6 hours, completing the preparation of the efficient sound-absorbing lightweight aggregate cellular concrete.

The resulting product had an NRC of 0.80, a bulk density of 500 kg/m$^3$, and a flexural strength of 1.8 MPa.

Comparative Example 1

Different from Example 1, steps 1, 2, 3, and 5 were omitted. Only steps 4, 6, 7, and 8 were performed to prepare cellular concrete, i.e., without the addition of non-sintered lightweight aggregate. The result was conventional cellular concrete.

The resulting product had an NRC of 0.45, a bulk density of 710 kg/m$^3$, and a flexural strength of 2.5 MPa.

Comparative Example 2

Different from Example 1, steps 6 and 7 were omitted, i.e., no physical foaming was introduced. The result was a pore structure composed only of expanded perlite pores and hydrogen peroxide foaming pores.

The resulting product had an NRC of 0.26, a bulk density of 1060 kg/m³, and a flexural strength of 3.0 MPa.

Comparative Example 3

Different from Example 1, expanded perlite was not added in step 3.

The resulting product had an NRC of 0.44, a bulk density of 760 kg/m³, and a flexural strength of 2.6 MPa.

TABLE 1

High-performance and efficient sound-absorbing lightweight aggregate cellular concrete

| Frequency (HZ) | Comparative example 1 | Comparative example 2 | Comparative example 3 | Example 1 | Example 2 | Example 3 |
|---|---|---|---|---|---|---|
| 63 | 0.228 | 0.080 | 0.215 | 0.238 | 0.192 | 0.208 |
| 80 | 0.164 | 0.095 | 0.155 | 0.257 | 0.217 | 0.216 |
| 100 | 0.164 | 0.120 | 0.158 | 0.289 | 0.263 | 0.227 |
| 125 | 0.255 | 0.140 | 0.250 | 0.331 | 0.315 | 0.289 |
| 160 | 0.333 | 0.160 | 0.310 | 0.425 | 0.326 | 0.342 |
| 200 | 0.398 | 0.190 | 0.370 | 0.495 | 0.389 | 0.463 |
| 250 | 0.405 | 0.215 | 0.410 | 0.594 | 0.572 | 0.554 |
| 315 | 0.388 | 0.230 | 0.370 | 0.681 | 0.668 | 0.642 |
| 400 | 0.377 | 0.240 | 0.365 | 0.770 | 0.712 | 0.698 |
| 500 | 0.372 | 0.250 | 0.355 | 0.862 | 0.836 | 0.794 |
| 630 | 0.391 | 0.260 | 0.370 | 0.896 | 0.798 | 0.846 |
| 800 | 0.404 | 0.270 | 0.385 | 0.925 | 0.838 | 0.898 |
| 1000 | 0.441 | 0.280 | 0.425 | 0.924 | 0.892 | 0.923 |
| 1250 | 0.515 | 0.290 | 0.500 | 0.939 | 0.878 | 0.946 |
| 1600 | 0.577 | 0.295 | 0.565 | 0.911 | 0.900 | 0.911 |
| 2000 | 0.581 | 0.300 | 0.570 | 0.931 | 0.923 | 0.941 |
| 2500 | 0.586 | 0.290 | 0.575 | 0.912 | 0.938 | 0.907 |
| 3150 | 0.61 | 0.270 | 0.595 | 0.928 | 0.917 | 0.881 |
| 4000 | 0.648 | 0.250 | 0.625 | 0.905 | 0.893 | 0.874 |
| 5000 | 0.674 | 0.230 | 0.645 | 0.926 | 0.867 | 0.863 |
| 6300 | 0.679 | 0.210 | 0.655 | 0.927 | 0.862 | 0.897 |

As shown in Table 1, in the efficient sound-absorbing lightweight aggregate cellular concrete of the present invention, the combination of chemically foamed and core-shell modified expanded perlite with physical foaming significantly improved the material's sound absorption performance, with high-frequency sound absorption coefficients reaching above 0.9. Moreover, by adjusting the particle size and incorporation ratio of the non-sintered lightweight aggregate, and the degrees of chemical and physical foaming, the material achieved relatively balanced broadband sound absorption performance with a tunable sound absorption frequency range. Therefore, the sound-absorbing lightweight aggregate cellular concrete prepared by the present invention is a high-efficiency sound-absorbing material with excellent performance, a wide sound absorption frequency range, and low-carbon sustainability.

The above descriptions are merely preferred embodiments of the present invention and are not intended to limit the present invention. For those skilled in the art, various modifications and changes may be made to the invention. Any modifications, equivalent substitutions, or improvements made within the spirit and principles of the present invention shall fall within the protection scope of the present invention.

The invention claimed is:

1. An efficient sound-absorbing lightweight aggregate cellular concrete, comprising:
85-95 parts by weight of sulfur-aluminum-ferric cementitious material, 5-15 parts by weight of supplementary cementitious material, 0.6-1.5 parts by weight of functional admixture, 20-60 parts by weight of non-sintered lightweight aggregate, 0.35-0.45 parts by weight of water, and 0.5-1.5 L of preformed foam;

wherein the non-sintered lightweight aggregate comprises, based on parts by weight: 40-50 parts of sulfur-aluminum-ferric cementitious material, 50-60 parts of byproduct gypsum, 0.7-1.5 parts of chemical foaming agent, 15-22 parts of water, and 5-8 parts of expanded perlite;

the efficient sound-absorbing lightweight aggregate cellular concrete has a noise reduction coefficient ≥0.80 and a bulk density≤500 kg/m³;

the functional admixture comprises, based on parts by weight: 0.2-0.6 parts of water reducer, 0.1-0.3 parts of thickener, and 0.3-0.6 parts of chopped fiber;

the efficient sound-absorbing lightweight aggregate cellular concrete constructs a multi-level and multi-scale pore structure system comprising expanded perlite pores, chemical foaming agent foaming pores, and physical foaming pores;

the supplementary cementitious material comprises slag, fly ash, or silica fume;

a method for preparing the efficient sound-absorbing lightweight aggregate cellular concrete comprises:

step 1: stirring the sulfur-aluminum-ferric cementitious materials, the supplementary cementitious material, the functional admixture, and water to form a uniformly mixed slurry;

step 2: adding a pre-wetted non-sintered lightweight aggregate into the uniformly mixed slurry, and continuing to stir; and step 3: adding the preformed foam, and stirring until no white foam remains, then casting in a mold for solidification, which can be demolded after 6-8 hours, thus completing the preparation of the efficient sound-absorbing lightweight aggregate cellular concrete;

in step 2, a method for preparing the non-sintered lightweight aggregate comprises:

mixing the sulfur-aluminum-ferric cementitious materials and the by-product gypsum in dry form uniformly to form a mixture; using the expanded perlite as a seed particle, and in a granulator, spraying the mixture while simultaneously spraying a mixture of chemical foaming agent and water, to complete the preparation of the non-sintered lightweight aggregate.

2. The efficient sound-absorbing lightweight aggregate cellular concrete according to claim 1, wherein 0.80≤ the noise reduction coefficient≤0.90, and 200 kg/m³≤ the bulk density≤500 kg/m³;

the sulfur-aluminum-ferric cementitious materials contains CaO≥37%, $Al_2O_3$≥20%, $Fe_2O_3$≥6%, and $SO_3$≥8%; and the supplementary cementitious material has a fineness specific surface area not less than 350 m²/kg.

3. The efficient sound-absorbing lightweight aggregate cellular concrete according to claim 1, wherein the water reducer is a polycarboxylate superplasticizer;

the thickener is selected from one or more of hydroxypropyl methyl cellulose ether, starch, and polyacrylamide; and the chopped fiber is selected from one or more of polypropylene fiber, polyvinyl alcohol fiber, and glass fiber, with a length of 3 mm-12 mm.

4. The efficient sound-absorbing lightweight aggregate cellular concrete according to claim 1, wherein the byproduct gypsum is desulfurization gypsum, phosphogypsum, or fluorogypsum, with a dihydrate gypsum content greater than 90% and an average particle size of ≤50 μm;

the chemical foaming agent is hydrogen peroxide with a mass concentration of 30-50%; and the expanded perlite has a bulk density of 100-130 kg/m³.

5. The efficient sound-absorbing lightweight aggregate cellular concrete according to claim 1, wherein the preformed foam comprises a foaming agent, water, and a foam stabilizer, wherein a dilution ratio of the foaming agent to water is 1: (20-45), and the foam stabilizer accounts for 2%-5% of the mass of the foaming agent;

the foaming agent is a rosin-based foaming agent, a synthetic surfactant foaming agent, a protein foaming agent, or a composite foaming agent; and the foam stabilizer is selected from one or more of Xanthan gum, silica gel, and polyvinyl alcohol.

6. The efficient sound-absorbing lightweight aggregate cellular concrete according to claim 1, wherein in step 1, stirring is performed for a time of 3-5 min at a speed of 40-60 r/min; and in step 2, stirring is performed at a speed of 25-35 r/min for a time of 1-3 min.

7. The efficient sound-absorbing lightweight aggregate cellular concrete according to claim 1, wherein in step 3, a method for preparing the preformed foam comprises: taking a foaming agent and diluting the foaming agent with water in a ratio of 1:(20-45), and adding a foam stabilizer that accounts for 2%-5% of the foaming agent mass, stirring uniformly to make a foaming liquid; taking the foaming liquid and placing the foaming liquid in a foaming machine to prepare the preformed foam.

* * * * *